Dec. 31, 1940.   H. J. McDEVITT   2,226,870
FILTERING UNIT CLEANER
Filed Nov. 9, 1937
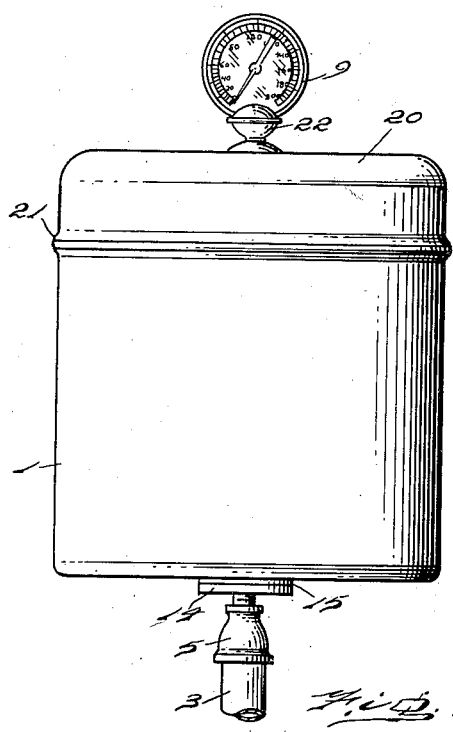
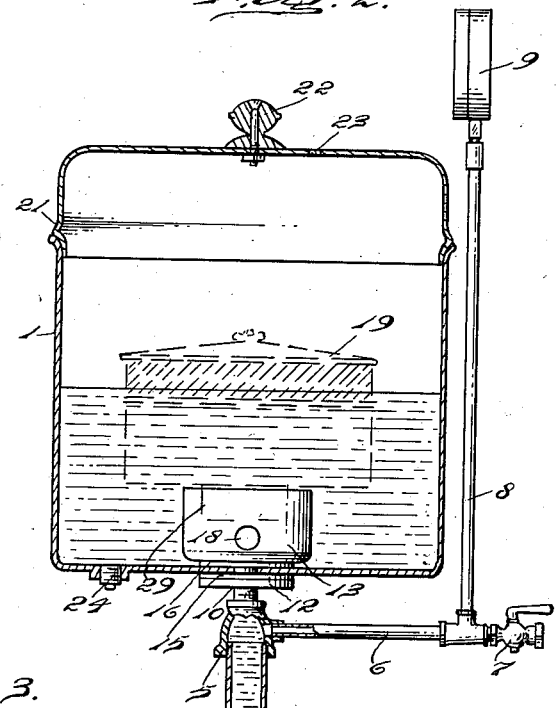
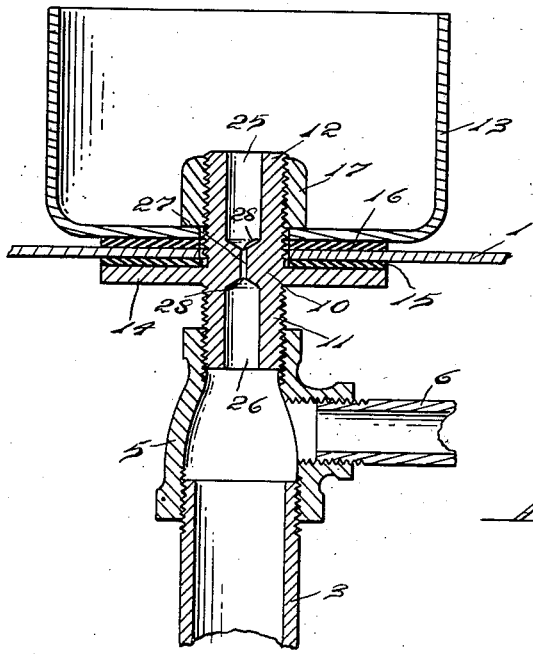
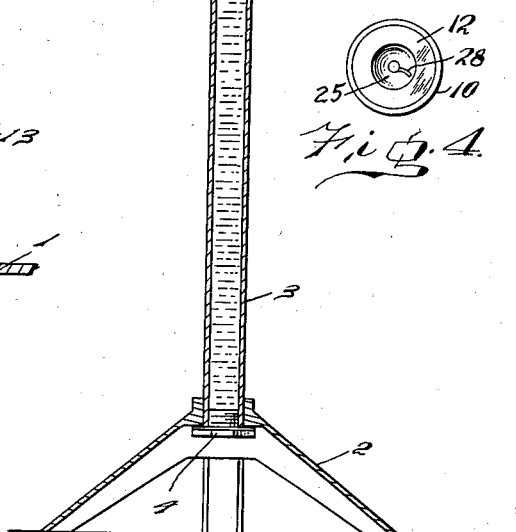
INVENTOR
Harry J. McDevitt
BY
Herbert S. Fairbanks
ATTORNEY Patented Dec. 31, 1940

2,226,870

UNITED STATES PATENT OFFICE 2,226,870

FILTERING UNIT CLEANER

Harry James McDevitt, Media, Pa., assignor, by mesne assignments, to Vulcan Manufacturing Co., Inc., St. Paul, Minn., a corporation of Minnesota Application November 9, 1937, Serial No. 173,571

2 Claims. (Cl. 141—1)

The object of this invention is to devise a novel construction of a cleaner which, although not limited to such use, is especially adapted to be employed in cleaning filtering units of automobile carbureters.

A further object is to provide a column of cleaning fluid in the standard and to cause the compressed air to pass through a restricted opening into a discharge passage, preferably in such a manner to give a rotary turbulence to the cleaning fluid and air as they pass through the filtering unit.

A further object of the invention is to provide a novel support for the filtering unit having one or more openings spaced above the bottom of the tank, so that the sediment and dirt from the filtering unit will be collected in the bottom of the tank instead of being recirculated through the filtering unit.

With the above and other objects in view as will hereinafter clearly appear, my invention comprehends a novel filtering unit cleaner.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a front elevation with the supporting standard broken away, of a filtering unit cleaner, embodying my invention.

Figure 2 is a sectional elevation.

Figure 3 is an enlarged sectional view showing more particularly the bowl or cup for supporting the unit and the construction of the passage leading thereto.

Figure 4 is a top plan view of the discharge end of a fitting.

Similar numerals of reference indicate corresponding parts.

Referring to the drawing:

1 designates the tank of a filtering unit cleaner, embodying my invention. The cleaner is provided with a skeleton base 2 apertured to receive a tubular column 3 which is closed at its lower end by a removable threaded plug 4. The upper end of the column 3 is threaded into a reducing fitting 5 having a threaded opening at one side to receive the compressed air supply pipe 6 which is provided with a controlling valve 7. A branch pipe 8 extends above the tank and carries a pressure gauge 9. A connecting member in the form of a fitting 10 connects the fitting 5 with the tank 1. The fitting 10 has a threaded lower extension 11 in engagement with the fitting 5 and an upper threaded extension 12 which extends through an opening in the bottom of the tank 1 and through the bottom of a bowl or cup shaped supporting member 13. The casting 10 has a flange 14 between which and the bottom of the tank a gasket 15 is interposed. A gasket 16 is provided between the bottom of the tank 1 and the member 13. A nut 17 engaging the threaded extension 12 retains the member 13 and the tank in sealed condition with the connecting member 10. The member 13 has one or more openings 18 through its side walls and spaced from the bottom of the tank. The member 13 forms a support for the filtering unit 19 to be cleaned which is inserted into the tank through its upper open end.

The top of the tank is closed by a cover 20 having a friction fit therewith.

The upper marginal edge of the tank is flared outwardly to receive the outwardly deflected shoulder forming portion 21 of the cover and thus limit the extent to which the cover can be pushed into the tank. The cover is provided with a handle 22 and with a vent opening 23. The bottom of the tank has a drain plug 24 to facilitate the removal of dirt and foreign matter removed from the filtering units.

The fitting 10 has an upper passage 25 and a lower passage 26 which are in communication by a restricted passage or port 27. The inner ends of the passages 25 and 26 are partially coned with a curved raised portion 28 which tends to give a swirling or rotary motion to the compressed air as it passes from the discharge passage 25 into the tubular extension 29 of the filtering unit to be cleaned.

The operation will now be apparent to those skilled in this art and is as follows:

The cover of the tank is removed and a cleansing fluid such as kerosene is poured into the tank. The filtering unit is placed in the chambered support with the tubular extension at the bottom, and the cover replaced. The high pressure air is now turned on, and the compressed air passes into the reducing fitting 5 entraining the kerosene therein and passes to the lower passage 26 of the fitting 10, through the restricted passage 27, and through the upper passage 25 into the tubular extension of the filtering unit. The cone and curved portions 28 give a rotary motion to the kerosene and compressed air as it passes through the filtering unit. When the highly compressed air passes into the fitting 5, the liquid in such fitting is entrained by the air and passes with it through the passage 26, into the fitting 10. When the compressed air strikes the lower raised portion 28 and the cone shaped upper end of the passage 26, a whirling motion is imparted to it, and such motion is increased when the air leaves the restricted passage 27 and strikes the raised portion 28. The air, passing upwardly from the passage 25, thus has a whirling motion imparted to it, and the highly compressed air with the entrained cleaning fluid passes through the filter and its passages under high pressure to effectively remove dirt, grease and foreign impurities. The dirt and foreign material in the filtering unit passes out through conventional openings in the upper side wall of the filtering unit, and such materials collect at the bottom of the tank below the openings 18 in the supporting member 13.

The cleaning fluid is entrained through the openings 18 and is circulated by the compressed air through the filtering unit.

It will now be apparent that I have devised a new and useful filtering unit cleaner, which embodies the features of advantage enumerated as desirable in the statement of the invention and the above description, and while I have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:

1. In a filter unit cleaner, a tank adapted to contain cleaning fluid and having an opening in the bottom thereof, nozzle means comprising a threaded member extending upwardly through said opening into said tank and having a shoulder beneath said bottom thereof, a cuplike support for the filter unit, said support having an opening receiving said threaded member, a retainer nut within said support on said threaded member to retain said tank, nozzle means and support assembled relative to each other, said nozzle means having a passage extending therethrough, and means to feed compressed air through said passageway.

2. In a filter unit cleaner, a tank adapted to contain cleaning fluid and having an opening in the bottom thereof, nozzle means comprising a threaded member extending through said opening into said tank and having an integral flange surrounding the intermediate portion of said member, a support for said tank threaded onto the lower end of said threaded member, a cuplike support for the filter unit, said support having an opening receiving the upper end of said threaded member, a retainer nut within said support on said upper end of said threaded member, said threaded member having a passageway therethrough, and means to supply compressed air through said passageway.

HARRY JAMES McDEVITT.